Dec. 20, 1960   A. G. MAKELA   2,965,411
VEHICLE WINDSHIELD WIPER TRANSMISSION ASSEMBLY
Filed Feb. 10, 1958

INVENTOR.
Armas G. Makela
BY
D. C. Staley
His Attorney

United States Patent Office 2,965,411
Patented Dec. 20, 1960

2,965,411

VEHICLE WINDSHIELD WIPER TRANSMISSION ASSEMBLY

Armas G. Makela, Clawson, Mich., assignor to General Motors Corporation, Detroit, Mich., a corporation of Delaware Filed Feb. 10, 1958, Ser. No. 714,306

2 Claims. (Cl. 296—1)

This invention pertains to motor vehicles, and particularly to a windshield wiper transmission assembly for motor vehicles.

Heretofore, it has been customary in the production of motor vehicles to design the wiper transmission housing escutcheon to fit only a particular body style, due to the different angular relationships between the wiper transmission housings and the escutcheons in different body styles. The present invention relates to a wiper transmission assembly wherein the same escutcheon can be used in different body styles inasmuch as it includes means for accommodating different angular relationships between the wiper transmission housings and the escutcheons. Accordingly, among my objects are the provision of a windshield wiper transmission assembly including means for accommodating different angular relationships between the axis of the transmission shaft and the escutcheon; the further provision of a windshield wiper transmission assembly having a housing which can be attached to a vehicle cowl with the axis of the transmission shaft having any one of a plurality of angular relationships with the escutcheon; and the still further provision of an escutcheon having an opening with a partially spherical surface and a washer having a complementary spherical surface whereby the washer and the escutcheon can have any one of a plurality of relative angular positions.

The aforementioned and other objects are accomplished in the present invention by attaching the escutcheon to the vehicle by means of a nut which threadedly engages the wiper transmission housing and bears against a washer which is capable of limited universal movement relative to the escutcheon. Specifically, the escutcheon is used to conceal the opening in the vehicle cowl through which the transmission housing projects. The transmission housing has a fixed angular relation with the cowl by reason of its attachment to an inner shroud of the vehicle body. Since different body styles may have different shrouds and windshield configurations, the angular relationship between the transmission housings and the cowl can vary. In order to accommodate different angular relationships, the escutcheon is formed with an internal spherical surface which is engageable with an external spherical surface formed on a washer. The spherical washer and the escutcheon are maintained in assembled relation by a spanner nut which threadedly engages the exterior of the transmission housing. In addition, the spanner nut maintains the escutcheon in assembled relation with the cowl of the vehicle.

Further objects and advantages of the present invention will be apparent from the following description, reference being had to the accompanying drawing, wherein a preferred embodiment is clearly shown.

Figure 1:
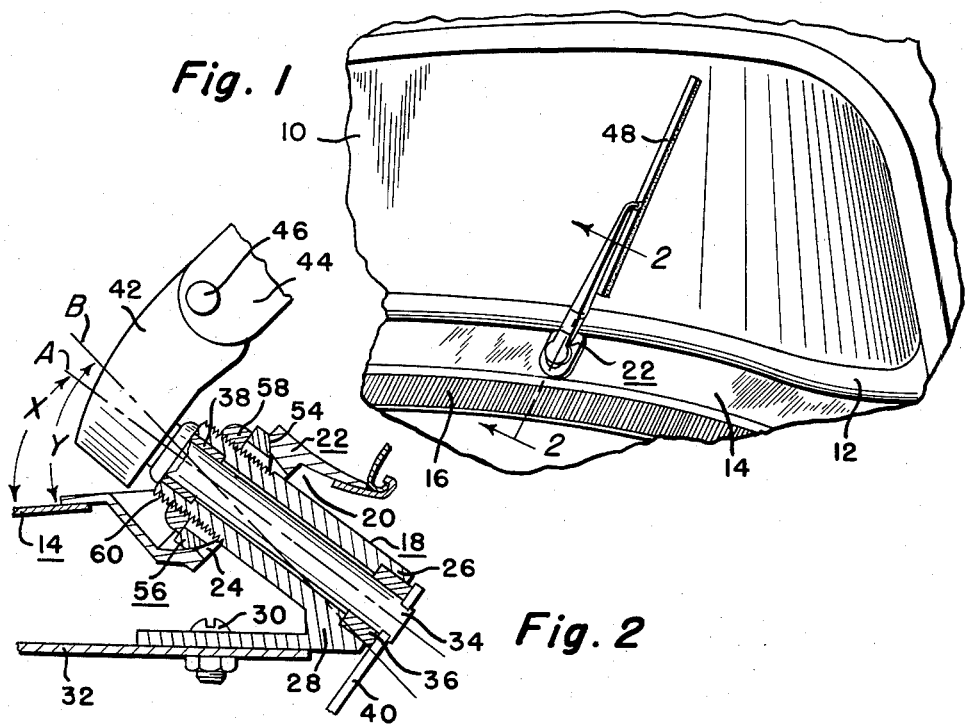
Figure 1 is a fragmentary view, in elevation, of a vehicle equipped with the windshield wiper transmission assembly of this invention.
Figure 2:
Figure 2 is an enlarged fragmentary sectional view taken along line 2—2 of Figure 1.

With particular reference to Figure 1, a portion of a vehicle is shown including a windshield 10, a reveal molding 12, an upper cowl panel 14 and an air intake grill 16. As seen in Figure 2, a windshield wiper transmission assembly 18 extends through an opening 20 in the upper cowl panel 14. The opening 20 is closed by an escutcheon 22 having an aperture 24 through which the transmission housing extends.

The transmission assembly 18 includes a housing 26 having an integral mounting bracket 28 which is attached by bolts 30 to a shroud member 32 disposed beneath the cowl panel 14. A wiper transmission, or pivot shaft, 34 is rotatably journalled in the housing 18 by spaced sleeve bearings 36 and 38. The inner end of the shaft 34 may be attached to a crank arm 40 for imparting oscillation to the shaft 34. The outer end of the shaft 34 may be formed with a burr, not shown, to which the socket section 42 of a wiper arm is drivingly connected. The socket section of the wiper arm is connected to an outer arm section 44 by a pivot pin 46, the outer section 44 also being spring biased toward the windshield in a conventional manner. The outer arm section 46 carries a wiper blade 48 movable across the outer surface of the windshield.

Figure 4:
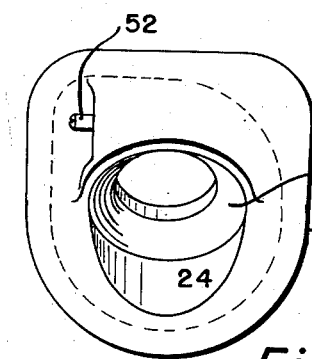
Figure 4 is a plan view of the escutcheon.

The escutcheon 22, as seen in Figure 4, is formed with a partially spherical surface 50 at the outer end of the aperture 24. The aperture 24 has a diameter appreciably larger than the diameter of the housing 26. The escutcheon 22 may also carry a washer nozzle 52. The spherical surface 50 of the escutcheon is engageable with a complementary spherical surface 54 formed on the exterior of a washer 56. The transmission housing 26 extends through the washer, and the spherical surface 54 of the washer is maintained in engagement with the spherical surface 50 of the escutcheon by a lock nut 58 which threadedly engages a threaded portion 60 of the housing 18.

As seen in Figure 2, the axis of the transmission assembly is indicated by a broken line A which is located at an angle X with respect to the cowl 14. The spherical washer 56 and the spherical surface of the escutcheon can accommodate various relative angular positions between the axis of the transmission assembly and the cowl 14. In other words, the construction of the assembly is such as to permit a limited universal movement between the washer 56 and surface 50 of the escutcheon 22 when the nut 58 is loosened.

Figure 3:
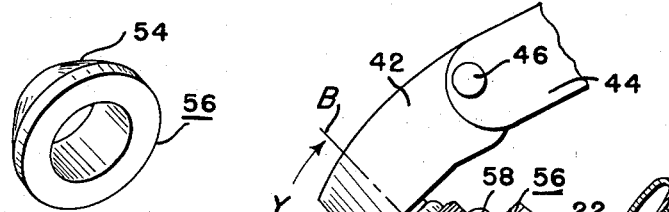
Figure 3 is a view, partly in section and partly in elevation, similar to Figure 2 showing a different angular relationship between the transmission assembly and the vehicle cowl.
Figure 5:
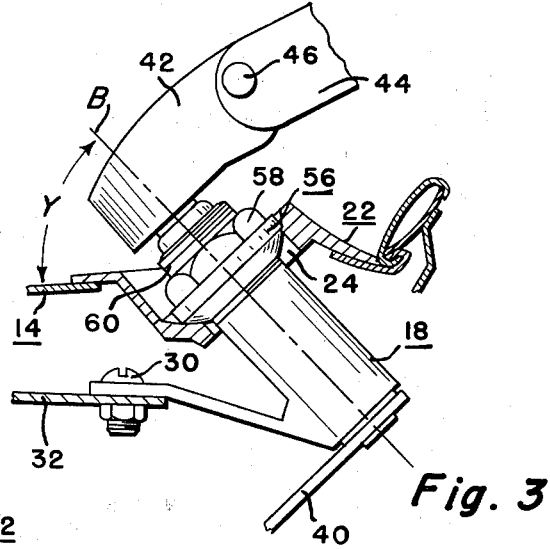
Figure 5 is an isometric view of the washer having a spherical surface.

As seen in Figure 3, the center line of the transmission assembly is indicated by broken line B which is located at an angle Y from the cowl 14. The different angular relationships between the transmission assembly and the cowl are accommodated by the spherical washer 56 which is shown in two of its extreme angular positions in Figures 2 and 3.

To assemble the windshield transmission in the motor vehicle, the housing 18 is first attached to the inner shroud member 32 so that the outer end thereof projects through the opening 20 in the upper cowl panel 14. Thereafter, the escutcheon 22 is placed over the transmission assembly so that its mounting surfaces engage the cowl panel 14. The spherical washer 56 is then placed over the transmission housing 18 after which the lock nut 58 is threaded onto the transmission housing 18 at 60 so as to retain the washer 56 and the escutcheon 22 in assembled relation with the vehicle cowl. Thereafter, the wiper arm and blade assembly are attached to the outer end of the transmission shaft 34.

From the foregoing it is readily apparent that the present invention enables the use of an interchangeable escutcheon for different body styles since it accommodates different angular relationships between the axis of the transmission shaft and the cowl of the vehicle. Moreover, by using the escutcheon and spherical washer combination of this invention, a common attaching surface in the vehicle for the transmission housing can be utilized for all vehicle body styles.

While the form of embodiment of the invention as herein disclosed constitutes a preferred form, it is to be understood that other forms might be adopted.

What is claimed is as follows:

1. In a vehicle, a cowl having an opening therethrough, a shroud attached to said vehicle and disposed beneath said cowl, a wiper transmission housing attached to said shroud and having a fixed angular relationship with said cowl, a single piece escutcheon for closing the opening in said cowl and having an aperture through which the transmission housing extends, said escutcheon having a spherical surface, a washer having a complementary spherical surface engageable with the spherical surface of said escutcheon, a nut threadedly engaging said transmission housing for urging said washer into engagement with the spherical surface of said escutcheon to secure said escutcheon to said cowl, said escutcheon being interchangeable with escutcheons of vehicles having different body styles wherein the transmission housings have different fixed angular relationships with the cowls thereof.

2. In a vehicle, a cowl having an opening therethrough, a shroud attached to said vehicle and disposed beneath said cowl, a wiper transmission housing attached to said shroud and having a fixed angular relationship with said cowl, a single piece escutcheon for closing the opening in said cowl and having an aperture therethrough through which said transmission housing extends, said escutcheon having an internal spherical surface, a washer having an external spherical surface engageable with the internal spherical surface of said escutcheon, and means attached to said transmission housing and engageable with said washer for securing said escutcheon to said cowl, said escutcheon being interchangeable with escutcheons of vehicles having different body styles wherein the transmission housings have different fixed angular relationships with the cowls thereof.

References Cited in the file of this patent

UNITED STATES PATENTS

| | | |
|---|---|---|
| 2,252,671 | Ludwig | Aug. 12, 1941 |
| 2,664,506 | Race | Dec. 29, 1953 |
| 2,693,333 | Race et al. | Nov. 2, 1954 |
| 2,739,681 | Bowers et al. | Mar. 27, 1956 |